(No Model.)
A. HALL.
AUTOMATIC GAS PRESSURE REGULATOR.
No. 586,089. Patented July 6, 1897.
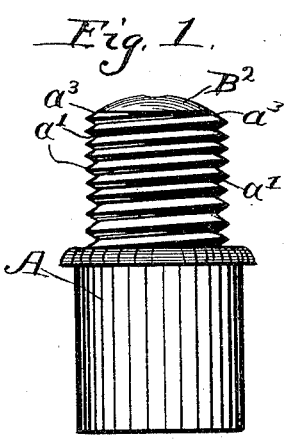
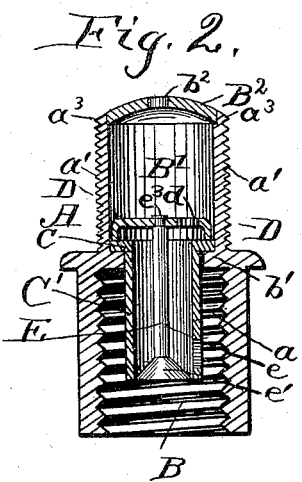
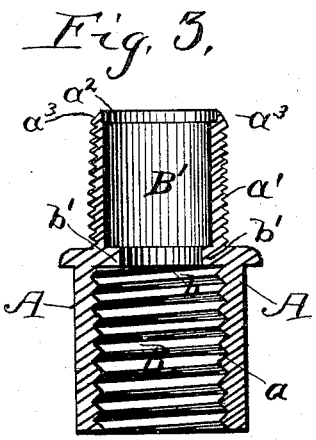
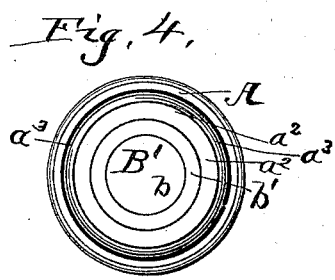
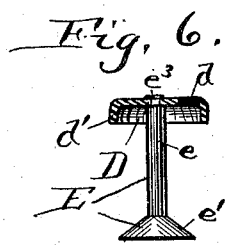
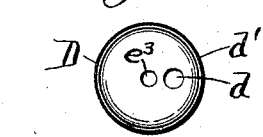
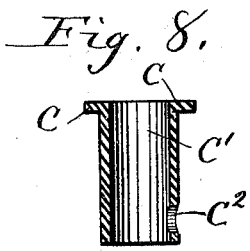
Witnesses:
Eleonora Ferusner
M. B. Lawrence
Alfred Hall, Inventor,
By Brown & Brown
Attys.

UNITED STATES PATENT OFFICE.

ALFRED HALL, OF CHICAGO, ILLINOIS.

AUTOMATIC GAS-PRESSURE REGULATOR.

SPECIFICATION forming part of Letters Patent No. 586,089, dated July 6, 1897.

Application filed February 12, 1897. Serial No. 623,126. (No model.)

*To all whom it may concern:*

Be it known that I, ALFRED HALL, a resident of Chicago, in the county of Cook and State of Illinois, have invented certain new and useful Improvements in Automatic Gas-Pressure Regulators, of which the following, when taken in connection with the drawings accompanying and forming a part hereof, is a full and complete description, sufficient to enable those skilled in the art to understand, make, and use the same.

This invention is an improvement upon the gas-pressure regulator set out and described in the patent granted The Davis & Stevens Manufacturing Company, No. 543,448, dated July 23, 1895, and is designed to be used in combination with an ordinary gas-tip for the purpose of obtaining therefrom a uniform pressure at a determined delivery per hour. The invention set out in the patent referred to is designed to be used with gas-stoves primarily, and means are provided for adjusting the pressure-regulator so that any desired pressure or flow of gas will be obtained, such pressure or flow being uniform after such adjustment is made. In such construction also means are provided whereby the outlet of the pressure-regulator is at right angles to the inlet thereof. In the practical construction and use of the gas-pressure regulator described in such Letters Patent it has been found that it is not desirable to leave the determination of the pressure or flow of gas to be adjusted after the gas-pressure regulator has left the factory, where the same is to be used in combination with an ordinary gas-tip used for illuminating purposes, but rather the flow should be determined and the pressure at the time of manufacturing the device, as, say, if five feet per hour is to be delivered the device should be made to so act as to deliver such quantity, and if six feet per hour be desired the construction and adjustment of the device should be made to conform to such requirement. Further, it is found that where the outlet of the pressure-regulator is at right angles to the inlet thereof, as in the device named, the same cannot be used in combination with an ordinary gas-tip designed to stand perpendicularly and be attached to an ordinary gas-delivery pipe.

The object of this invention is to lessen the cost of manufacturing gas-pressure regulators, to obtain a gas-pressure regulator which can be combined with an ordinary gas-tip for illuminating purposes, and to obtain a gas-pressure regulator wherein all springs or their equivalents (except so far as gravity is an equivalent of a spring) shall be dispensed with.

A further object of the invention is to obtain an automatic gas-pressure regulator wherein any sudden increase of pressure in the house-pipes will not produce such sudden and complete action thereof as to cause the burning gas to be extinguished.

I have illustrated the device embodying my invention by drawings giving very complete illustrations of the several parts and their manner of being joined together, as the construction of such parts, the assembling thereof, and the relative working positions constitute essential features in the invention, and in these drawings—

Figure 1 is a side elevation of an automatic gas-pressure regulator embodying the invention adapted to be interposed between the delivery end of the house-pipe and the ordinary illuminating-gas tip; Fig. 2, a vertical sectional view thereof; Fig. 3, a vertical sectional view of the outer shell or case of such gas-pressure regulator; Fig. 4, a top plan view of such outer shell or case; Fig. 5, a side elevation of a cap secured at the upper end of the shell or case of the pressure-regulator; Fig. 6, a vertical sectional view of the movable piston or balance-valve of the gas-pressure regulator; Fig. 7, a top plan view thereof; and Fig. 8, a vertical cross-sectional view of a diaphragm and depending cylinder or collar, on which diaphragm the piston illustrated in Figs. 6 and 7 rests when the apparatus is not in use and in which collar the valve of the movable piston or balance-valve freely moves when the apparatus is in working position, and the gas-tip thereover is lighted.

A reference-letter applied to designate a given part is used to indicate such part throughout the several figures of the drawings wherever the same appears.

A is the shell or casing of the device, having the chamber B therein, with internal screw-threads $a$ $a$ fitting over the screw-threads of an ordinary house delivery-pipe, and chamber B' in the upper end thereof, with communicating passage-way $b$ between the two chambers.

$a'$ $a'$ are external screw-threads on shell or case A, fitting into the internal screw-threads of an ordinary gas-tip.

$a^2$ is a shoulder at the upper end of the chamber B', and $a^3$ is a beveled outer edge of the upper end of the shell or case A, such beveled edge being designed to be turned over upon the upper face of the crowned diaphragm B² when such diaphragm is placed in the upper end of the shell or case A and resting on the shoulder $a^2$, and so maintain such crowned diaphragm B² in position.

$b^2$ is a central hole or aperture through the crowned diaphragm B², such opening forming the outlet of the apparatus.

C is a diaphragm having the depending cylinder C' on the under side thereof, and such cylinder C' being perforated on the side thereof, as at $c^2$. D is a movable piston, perforated, as at $d$, secured to the upper end of the piston E. The piston D is movable in the chamber B', and the piston E is movable in the cylinder C.

$e$ is the stem of piston E, and $e'$ is a valve at the lower end thereof.

$e^2$ is a shoulder at the upper end of stem $e$.

Piston D is constructed of sheet metal or cast metal properly turned up to obtain the rim $d'$, and has a central perforation therein fitting over the top of the stem $e$, so as to rest on the shoulder $e^2$, and hence to secure the pistons D and E together it is simply necessary to rivet the upper end of stem $e$ over on the piston D, as is well shown in Fig. 6 at $e^3$.

In assembling the several parts forming the apparatus the diaphragm C is forced down in chamber B' onto the shoulder $b'$, such diaphragm fitting so closely to the walls of the chamber as to be held firmly in place thereby. Piston D is then dropped into the chamber B' with the piston or valve E in the cylinder C'. The opening in cylinder C' is placed in proper relative position with the stem $e$, so that when the lower edge of the rim $d'$ is on the upper face of the diaphragm C the valve $e'$ is below such opening $C^2$, and the chamber B' is of proper height relative to such stem $e$ that when the piston D is in its highest possible position in such chamber B' the valve $e'$ is above such perforation $C^2$ in cylinder C'. The upward movement of the piston D is determined by the crowned diaphragm B², such diaphragm being crowned for the purpose of obtaining a chamber above the piston D—that is, between the upper surface of piston D and the lower face of crowned diaphragm B²—when such piston D is at its highest possible position with the peripheral edge thereof in contact with the bottom edge of such crowned diaphragm B². Crowned diaphragm B² is then put in place on shoulder $a^2$ and the upper end of the beveled edge $a^3$ is turned over upon it to hold it in place.

As will be readily understood, the operation of the device is: gas entering chamber B from the house-pipe and being under pressure the valve $e'$ is raised, thereby closing aperture $C^2$. If the valve $e'$ fitted closely in cylinder $c'$, no gas would be delivered from the gas-pressure regulator when the valve $e'$ has been forced, as last above described, above the opening $C^2$ in cylinder C', and to prevent the complete stoppage of the flow of gas through cylinder C' the valve $e'$ is made to fit loosely therein. The looseness of the fit of the valve $e'$ in cylinder C' determines to a certain extent the quantity of gas which will flow through the apparatus, as does also the size of the opening $d$ in piston D, and hence when a large flow of gas, as, say, six feet per hour, is desired through such apparatus the hole $d$ and cylinder C' are both made larger than when the flow is to be, say, five cubic feet of gas per hour through the apparatus. A very satisfactory adjustment of flow is obtained by using different-sized drills in making hole $d$ and cylinder C' or in reaming out such holes, and hence I obtain my adjustment of the quantity of gas to be delivered in this manner.

The gas in chamber B' being under pressure and having moved the valve $e'$ and piston D, mounted on the upper end of stem $e$, therewith, gas will flow around the loosely-fitting valve $e'$ in cylinder C' and enter chamber B' underneath the piston D, obtaining pressure therein, such pressure assisting in maintaining the valve $e'$ and piston D in a raised or closed position, such pressure being, however, diminished by the escape or flow of gas through hole or aperture $d$ in piston D into the part of chamber B' above such piston and between it and the crowned diaphragm B². The pressure above the piston D is diminished by the escape or flow of the gas therein through the opening $b^2$ into the passage-way in the gas-tip thereover and its discharge therefrom.

The reduction of the pressure in the chamber B' underneath the piston D, together with the flowing of gas around valve $e'$ through cylinder C', will permit the valve E and piston D to fall in their respective casings, so as to partially open the cross-opening $C^2$ in cylinder C' by valve $e'$ passing below such opening, or partially so.

By a proper crowning of the crowned diaphragm B² the chamber B' above the piston D, when such piston is at its highest possible position, will present such a frictional path for the gas flowing therethrough as to obtain the required pressure above such piston D. For instance, if the crowned diaphragm were horizontal on its under side the upper surface of the piston D would come in contact therewith, and the opening $d$ in piston D being to one side of the central opening $b^2$ in such diaphragm $B^2$ considerable pressure would be obtained (the fit of piston D to diaphragm $B^2$ being such that some gas would at all times pass out of the opening $b^2$) above or on the upper face of piston D, thereby assisting the force of gravity to depress such piston D and valve E.

Having thus described my invention, what I claim, and desire to secure by Letters Patent, is—

1. In an automatic gas-pressure regulator, the combination of a shell or casing having internal screw-threads therein fitting over the outlet of a house gas-pipe and external screw-threads fitting into the screw-threads of a gas-tip, an upper and a lower chamber being formed in such casing, a diaphragm separating the chambers, with a depending cylinder on the under side of the diaphragm, a cross-opening in the cylinder, a piston having a downturned peripheral edge in the upper cylinder-chamber, a valve-stem depending from the piston and extending into the cylinder, with a valve at the lower end thereof fitting loosely in the cylinder, a hole in the piston to one side of the center, and a crowned diaphragm secured in the upper end of the casing with a central opening; substantially as described.

2. In an automatic gas-pressure regulator, the combination of a shell having internal screw-threads in the lower end thereof and external screw-threads on the upper end thereof, a diaphragm having a cylinder depending therefrom pressed into the shell and against a shoulder therein, a cross-opening in the cylinder, a piston in the shell above the diaphragm, such piston having downturned peripheral edges, a valve-stem depending from the piston, a valve in the cylinder on the lower end of the stem, such valve fitting loosely in the cylinder, and the piston to which the valve-stem is secured having an opening therethrough to one side of the center thereof, with a crowned diaphragm in the upper end of the shell, resting against a shoulder, with the beveled edge of the shell turned over on such crowned diaphragm, holding it in place.

ALFRED HALL.

In presence of—
CHARLES TURNER BROWN,
W. B. MOORE.